(12) United States Patent
Ouyang et al.

(10) Patent No.: US 7,397,862 B2
(45) Date of Patent: Jul. 8, 2008

(54) METHOD OF DESIGNING INTERLEAVERS FOR MULTIPLE-ENCODER MIMO OFDM SYSTEMS

(75) Inventors: Xuemei Ouyang, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 442 days.

(21) Appl. No.: 11/253,855

(22) Filed: Oct. 18, 2005

(65) Prior Publication Data

US 2007/0086538 A1    Apr. 19, 2007

(51) Int. Cl.
*H04L 1/02* (2006.01)
(52) U.S. Cl. ................. 375/267; 370/208; 370/310; 375/316; 375/299; 375/347; 375/260; 375/286
(58) Field of Classification Search .......... 375/267, 375/299, 347; 370/208, 310
See application file for complete search history.

(56) References Cited

U.S. PATENT DOCUMENTS 5,745,528 A * 4/1998 Fimoff et al. ............. 375/316
5,987,070 A * 11/1999 Fimoff et al. ............. 375/286
2003/0074625 A1* 4/2003 Adar et al. ................ 714/752
2004/0059981 A1* 3/2004 Cucchi et al. ............. 714/752
2006/0090120 A1* 4/2006 Chen ........................ 714/790
2007/0086538 A1* 4/2007 Ouyang et al. ........... 375/267
2007/0127587 A1* 6/2007 Ouyang et al. ........... 375/267
2007/0140103 A1* 6/2007 Ouyang et al. ........... 370/208
2007/0140364 A1* 6/2007 Ouyang et al. ........... 375/260
2007/0147521 A1* 6/2007 Horng et al. ............. 375/260

* cited by examiner

*Primary Examiner*—David Q Nguyen
(74) *Attorney, Agent, or Firm*—Kenneth L. Sherman, Esq.; Michael Zarrabian, Esq.; Myers Dawes Andras & Sherman, LLP

(57) ABSTRACT

An improved interleaver design to fully explore the diversity of the MIMO OFDM systems provides higher diversity gain than usual. A method for wireless data communication using such interleaver design implements parsing a bit stream into multiple spatial data streams, interleaving the bits in each spatial data stream by performing bit circulation to increase diversity of the wireless system, and transmitting the bits of each spatial data stream.

12 Claims, 5 Drawing Sheets

METHOD OF DESIGNING INTERLEAVERS FOR MULTIPLE-ENCODER MIMO OFDM SYSTEMS

FIELD OF THE INVENTION

The present invention relates generally to data communication, and more particularly, to data communication with transmission diversity using Orthogonal Frequency Division Multiplexing (OFDM) in multiple antenna channels.

BACKGROUND OF THE INVENTION

In wireless communication systems, antenna diversity plays an important role in increasing the system link robustness. OFDM is used as a modulation technique for transmitting digital data using radio frequency signals (RF). In OFDM, a radio signal is divided into multiple sub-signals that are transmitted simultaneously at different frequencies to a receiver. Each sub-signal travels within its own unique frequency range (sub-channel), which is modulated by the data. OFDM distributes the data over multiple channels, spaced apart at different frequencies.

OFDM modulation is typically performed using a transform such as Fast Fourier Transform (FFT) process wherein bits of data are encoded in the frequency-domain onto sub-channels. As such, in the transmitter, an Inverse FFT (IFFT) is performed on the set of frequency channels to generate a time-domain OFDM symbol for transmission over a communication channel. The IFFT process converts the frequency-domain phase and amplitude data for each sub-channel into a block of time-domain samples which are converted to an analogue modulating signal for an RF modulator. In the receiver, the OFDM signals are processed by performing an FFT process on each symbol to convert the time-domain data into frequency-domain data, and the data is then decoded by examining the phase and amplitude of the sub-channels. Therefore, at the receiver the reverse process of the transmitter is implemented. Further, transmit antenna diversity schemes are used to improve the OFDM system reliability. Such transmit diversity schemes in OFDM systems are encoded in the frequency-domain as described.

OFDM has been selected as the basis for the high speed wireless local area network (WLAN) standards by the IEEE standardization group. Referring to FIG. 1, a conventional transmitter 100 for an OFDM MIMO system implementing WLAN comprises a source of data bits 102, a spatial parser 104, and multiple data stream processing paths 106. Each data stream processing path 106 comprises: a channel encoder & puncturer 108, a frequency interleaver 110, a constellation mapper 112, an IFFT function 114, a guard-interval (GI) window insertion 116 and an RF modulator 118.

The system diagram in FIG. 1 represents a MIMO OFDM structure for 20 MHz channelization, and uses two independent convolutional-code encoders for the two data paths. Further, two IEEE 802.11a interleavers are used independently, each interleaver 110 corresponding to each encoder. Interleaver in FIG. 1 provides an optimal design for single antenna systems by fully exploring the frequency diversity. However, for multiple antenna systems, this design does not explore the spatial diversity brought in by the multiple antennas. Thus, there is a need for an interleaver design to fully explore the diversity of the MIMO OFDM systems.

BRIEF SUMMARY OF THE INVENTION

The present invention provides an improved interleaver design to fully explore the diversity of the MIMO OFDM systems. A bit flip and circulation interleaver design is provided for multiple encoder MIMO OFDM systems. Such an interleaver according to the present invention provides higher diversity gain than the conventional one. Accordingly, in one embodiment the present invention provides a system and method for wireless data communication, implementing the steps of: parsing a bit stream into multiple spatial data streams; interleaving the bits in each spatial data stream by performing bit circulation to increase diversity of the wireless system; and transmitting the bits of each spatial data stream. The steps of interleaving the bits in each spatial data stream further includes the steps of performing bit flipping.

In one example, the steps of interleaving the bits include the steps of splitting the bits in each data stream into multiple groups corresponding to subcarriers in a transmission symbol, performing a bit flip operation on the subcarriers, circulating the bits among the groups, and combining the bits for the different data streams to form a new bit sequence for transmission. The bit flip operation further includes the steps of performing a bit flip operation on the subcarriers such that the bits on the same subcarrier are treated as a group which cannot be broken further down to smaller units.

These and other features, aspects and advantages of the present invention will become understood with reference to the following description, appended claims and accompanying figures.

DETAILED DESCRIPTION OF THE INVENTION

In one embodiment, the present invention provides an improved method interleaving for a MIMO OFDM system. The interleaving method improves exploration of the diversity of an MIMO OFDM system, providing higher diversity gain than usual.

A bit flip and circulation interleaver design is provided for multiple encoder MIMO OFDM systems. Such an interleaver according to the present invention provides higher diversity gain than usual. Accordingly, in one embodiment the present invention provides a system and method for wireless data communication, implementing the steps of: parsing a bit stream into multiple spatial data streams; interleaving the bits in each spatial data stream; performing bit flipping; and performing bit circulation to increase diversity of the wireless system.

Accordingly, an embodiment of an improved interleaver according to the present invention performs interleaving (e.g., IEEE 802.11a interleaving) on a data stream, and thereafter further performs a bit split into different groups by a bit flip and then a bit circulation, to complete the interleaver operation. In one example, the steps of interleaving the bits in an improved interleaver according to the present invention include the steps of: (1) splitting the bits in each data stream into multiple groups corresponding to subcarriers in a transmission symbol, (2) performing a bit flip operation on the subcarriers, (3) circulating the bits among the groups, and (4) combining the bits for the different data streams to form a new bit sequence for transmission.

The bit flip operation further includes the steps of performing a bit flip operation on the subcarriers such that the bits on the same subcarrier are treated as a group which cannot be broken further down to smaller units. In this description, "bit flip and circulation" is the same as "bit flip and rotation". As such, bit circulation and bit rotation are the same operations.

Figure 1:
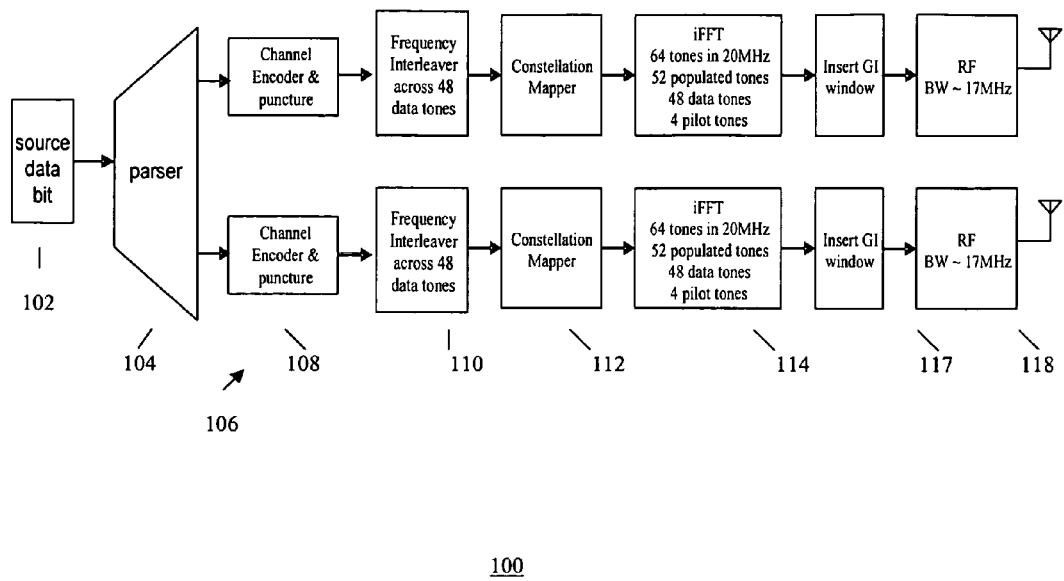
FIG. 1 shows a block diagram of a MIMO OFDM transmitter.
Figure 2:
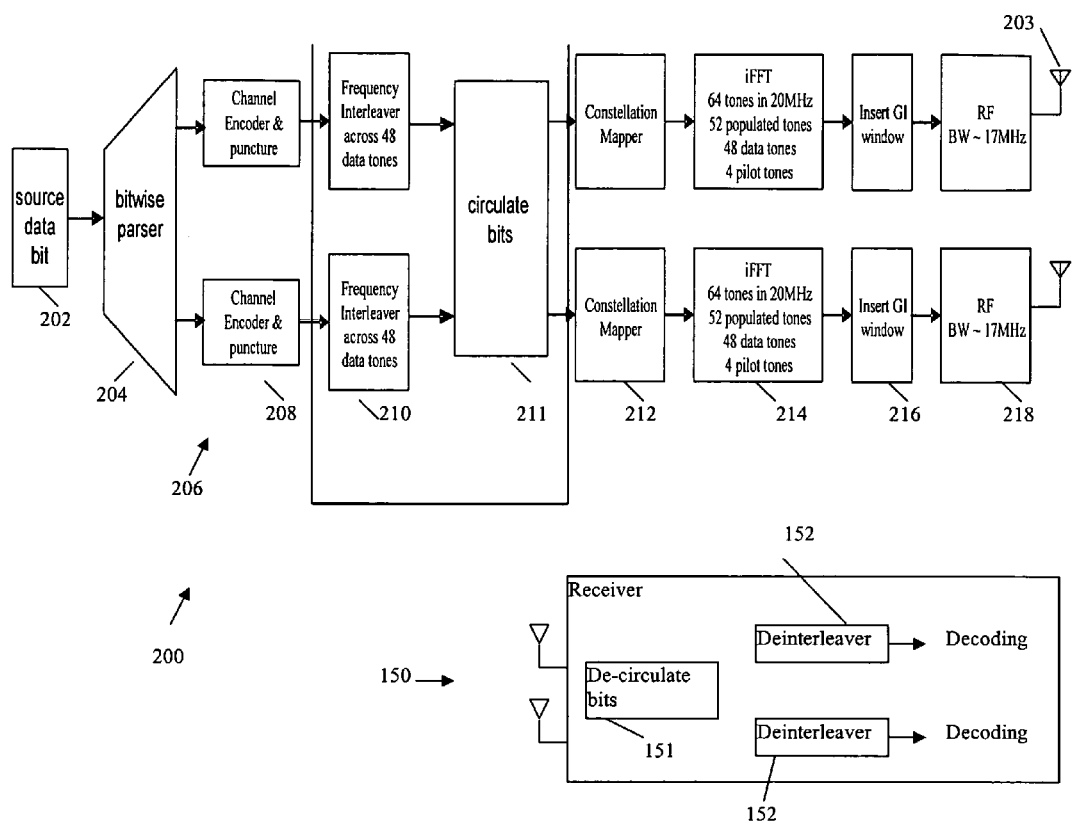
FIG. 2 shows an example block diagram of an embodiment of a MIMO OFDM transmitter according to an embodiment of the present invention.

FIG. 2 shows a block diagram of an example OFDM MIMO transmitter 200 of a MIMO system, wherein the transmitter 200 implements an embodiment of the improved interleaving method according to the present invention. The transmitter 200 comprises: a source of data bits 202, a bitwise spatial parser 204, and multiple data stream processing paths 206 (e.g., two paths for two antennas 203). Each data stream processing path 206 corresponds to a transmit antenna 203, wherein each path 206 comprises: a channel encoder & puncturer 208, a frequency interleaver 210, a constellation mapper 212, an IFFT function 214, a guard-interval (GI) window insertion 216 and an RF modulator 218. Each data stream processing path 206 further includes a bit circulation unit 211, connected between the interleaver 210 and the constellation mapper 212, described further below.

FIG. 2 further shows a receiver 150 corresponding to the transmitter 200, forming a MIMO system. The receiver 150 includes a bit de-circulation unit 151 that performs the reverse operation of bit circulation unit 211, and deinterleavers 152 that perform the reverse operation of the interleavers 210 in the transmitter 200.

Figure 3:
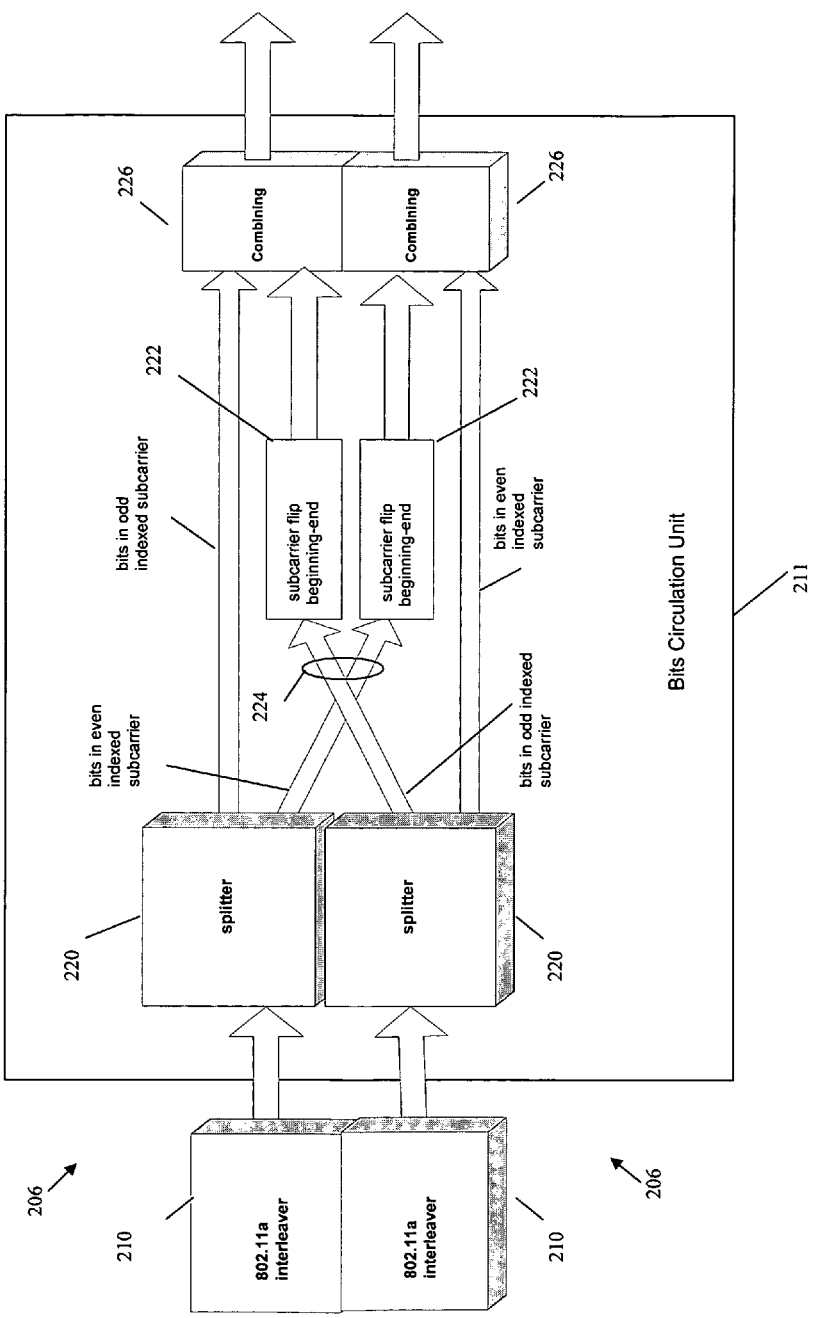
FIG. 3 shows an example block diagram of details of interleaving in FIG. 2.

FIG. 3 shows an example block diagram of an embodiment of interleaving according to the present invention utilizing the bit circulation unit 211 of FIG. 2, providing a bit flip and circulation interleaving operation. The bit circulation unit 211 allows bit circulation among different antennas to incorporate the spatial diversity into one data stream. The example bit circulation unit 211 implements multiple processing units including, for each path 206: a splitter 220, a bit flipper 222, a bit circulator 224, and a combiner 226, described below.

In this example, for each data stream processing path 206, the corresponding splitter 220 splits the output bits of the corresponding interleaver 210 (e.g., IEEE 802.11a) into two bit groups. One group (Group 1) corresponds to the bits in the odd index subcarriers in an OFDM symbol. The other group (Group 2) corresponds to the bits in the even index subcarriers in an OFDM symbol.

For example, in a BPSK modulated OFDM transmitter, each subcarrier carries 1 bit and the bit-splitting will look like the following:

Group 1: 1 3 5 7 9 . . . 47
Group 2: 2 4 6 8 10 . . . 48

In a 64 QAM modulated OFDM transmitter, where each subcarrier carries 6 bits, the bit-splitting will look like the following:

Group 1: 1 2 3 4 5 6; 13 14 15 16 17 18; . . . 277 278 279 280 281 282
Group 2: 7 8 9 10 11 12; 19 20 21 22 23 24; . . . 283 284 285 286 287 288

For each data stream processing path 206, the corresponding bit flipper 222 performs a bit flip operation on subcarriers. The bits on the same subcarrier are treated as a group which cannot be broken further down to smaller units. After the flip operation, the group of bits on subcarrier k are placed on subcarrier N−k+1 and vice versa, where N is the total number of subcarriers, k=1 . . . N.

The bit circulator 224 for each data stream processing path 206, exchanges the bits in Group 2 for the first antenna with Group 1 for the second antenna. The combiner 226 for each data stream processing path 206 combines the bits for different antennas to form a new bit sequence for transmission.

Simulation results verify the improved performance of a MIMO system implementing an interleaving method described above (e.g., FIGS. 2-3 for 20 MHz channelization).

The coding and modulation set (MCS) for an example simulation is listed in Table 1 below. MCS14 uses 64 QAM, rate 3/4 convolutional code (133, 171).

TABLE 1

MCS definition in simulation

| Symbol | Number of spatial streams | Modulation | Coding rate |
|--------|---------------------------|------------|-------------|
| MCS14  | 2                         | 64-QAM     | 3/4         |
| MCS13  | 2                         | 64-QAM     | 2/3         |
| MCS11  | 2                         | 16-QAM     | 1/2         |

IEEE 802.11n channel models BNLOS and DNLOS have been used for simulation with the assumption of perfect synchronization, no RF impairment and perfect channel estimation. Further, an MMSE detector is used for data stream separation.

Figure 4A:
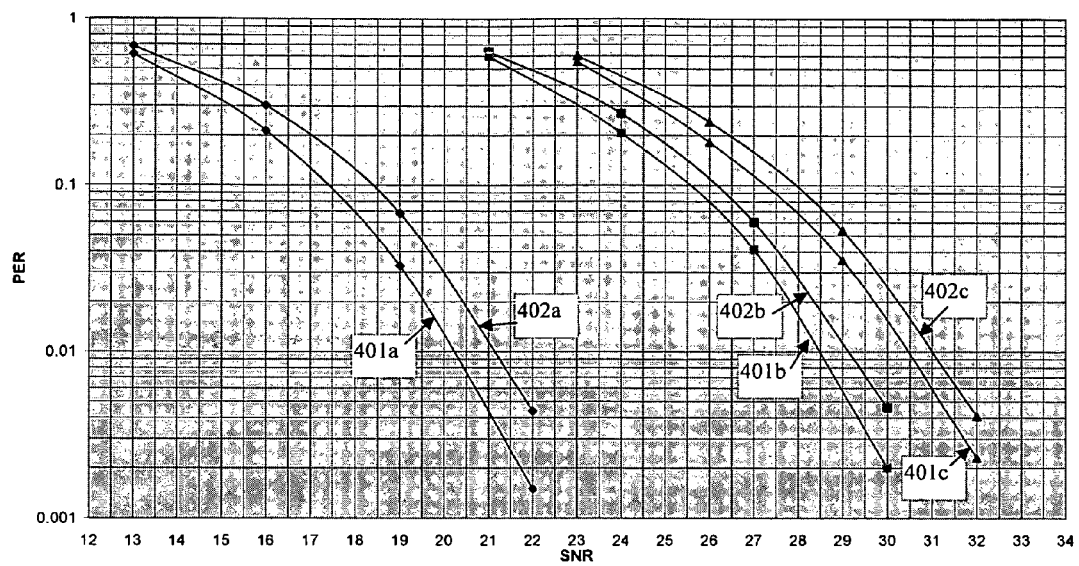
FIGS. 4A-B show example simulation results in a 20 MHz channel using a transmitter according to FIG. 2.
Figure 4B:
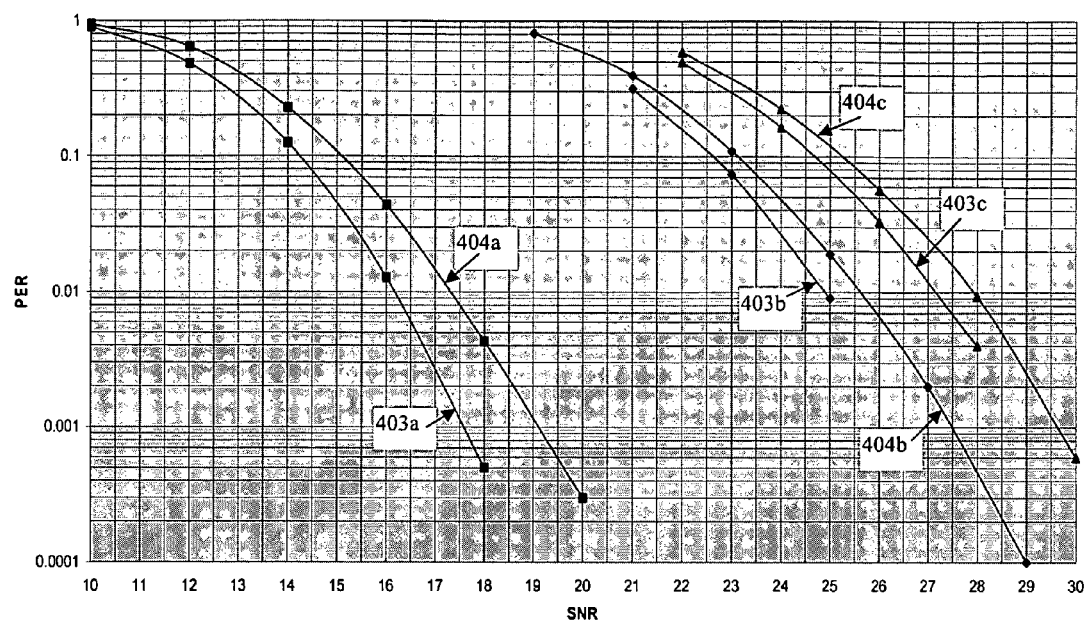

FIGS. 4A-B shows example simulations results. Specifically, FIG. 4A shows an example of the performance improvement with group bit flip and rotation. The simulations were conducted under IEEE 802.11n Channel model B. MCS11/13/14 were simulated. The example curves 401a, 401b and 401c correspond to MCS11, MCS13 and MCS14 simulations, respectively, and represent the Packet Error Rate (PER) vs. SNR performance with the flip and rotation operation of the present invention. The curves 402a, 402b, and 402c also correspond to MCS11, MCS 13 and MCS14 simulations, respectively, and represent the PER vs. SNR performance of the system without the flip and rotation operation. The curves in FIG. 4A illustrate that for different MCS modes, the performance improvement according to an embodiment of the present invention ranges from 0.5 to 1 dB at PER level of $10^{-2}$.

FIG. 4B shows another example of the performance improvement with group bit flip and rotation. The simulations were conducted under IEEE 802.11n Channel model D. MCS11/13/14 were simulated. The example curves 403a, 403b and 403c correspond to MCS11, MCS 13 and MCS14 simulations, respectively, and represent the Packet Error Rate (PER) vs. SNR performance with the flip and rotation operation of the present invention. The curves 404a, 404b, and 404c also correspond to MCS11, MCS 13 and MCS14 simulations, respectively, and represent the PER vs. SNR performance of the system without the flip and rotation operation. The curves in FIG. 4B illustrate that for different MCS modes, the performance improvement according to an embodiment of the present invention ranges from 0.5 to 1 dB at PER level of $10^{-2}$.

The above example interleaving implementations according to the present invention provide e.g. about 0.5 to 1 dB gain over the conventional interleaving methods. Although the description herein is based on two data streams in a two-antenna system, as those skilled in the art will recognize, the present invention is not limited to a specific number of transmission data streams and transmission antennas. With N transmission data streams, each stream can be split into N sub-streams for flip and rotation. The optimal flip method would depend on N, but using the same principle as described in the examples above. The optimal swap number also depends on N, but using the same principle as described in the examples above.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of data communication in a wireless system, comprising the steps of:
   parsing a bit stream into multiple spatial data streams;
   interleaving the bits in a spatial data stream by steps including bit circulation to increase diversity of the wireless system;
   forming new data streams by bit combining after the bit circulation; and
   transmitting the bits of each newly formed spatial data stream.

2. The method of claim 1 wherein the steps of interleaving the bits in each spatial data stream further includes the steps of performing bit flipping.

3. The method of claim 1 wherein the steps of interleaving the bits further includes the steps of:
   interleaving the bits according to IEEE 802.11a interleaving;
   splitting the bits in each data stream into multiple groups corresponding to subcarriers in a transmission symbol;
   performing a bit flip operation on the subcarriers;
   circulating the bits among the groups; and
   combining the bits for the different data streams to form a new bit sequence for transmission.

4. The method of claim 3 wherein the bit flip operation further includes the steps of performing a bit flip operation on the subcarriers such that the bits on the same subcarrier are treated as a group which cannot be broken further down to smaller units.

5. The method of claim 3 wherein the bit flip operation further includes the steps of placing the group of bits on subcarrier k on subcarrier N−k+1 and vice versa, wherein N is the total number of subcarriers, k=1 . . . N.

6. The method of claim 1 wherein the wireless system comprises an OFDM MIMO system.

7. A wireless communication system, comprising:
   a transmitter including:
      a parser that parses a bit stream into multiple spatial data streams;
      multiple interleavers corresponding to the multiple spatial data streams, wherein each of one or more interleavers performs interleaving of the bits in each of one or more spatial data streams by steps including bit circulation to increase diversity of the wireless system, the interleavers further forming new spatial data stream by bit combining after the bit circulation;
      a modulator that transmits the bits of each newly formed spatial data stream; and
   a receiver that receives and deinterleaves the transmitted bits.

8. The system of claim 7 wherein the bit circulation unit further performs bit flipping.

9. The system of claim 7 wherein the bit circulation unit includes:
   a splitter for splitting the bits in each data stream into multiple groups corresponding to subcarriers in a transmission symbol;
   a flipper for performing a bit flip operation on the subcarriers;
   a circulator for circulating the bits among the groups; and
   a combiner combining the bits for the different data streams to form a new bit sequence for transmission.

10. The system of claim 9 wherein the bit flip operation further includes performing a bit flip operation on the subcarriers such that the bits on the same subcarrier are treated as a group which cannot be broken further down to smaller units.

11. The system of claim 9 wherein the bit flip operation further includes placing the group of bits on subcarrier k on subcarrier N−k+1 and vice versa, wherein N is the total number of subcarriers, k=1 . . . N.

12. The system of claim 7 wherein the wireless system comprises an OFDM MIMO system.

* * * * *